United States Patent
Yoshida et al.

(10) Patent No.: US 7,623,263 B2
(45) Date of Patent: Nov. 24, 2009

(54) SETTINGS FOR MONOTONE PRINTING AND COLOR PRINTING

(75) Inventors: Seishin Yoshida, Nagano-ken (JP); Toyohiko Mitsuzawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 647 days.

(21) Appl. No.: 11/401,379

(22) Filed: Apr. 11, 2006

(65) Prior Publication Data
US 2006/0250444 A1 Nov. 9, 2006

(30) Foreign Application Priority Data
Apr. 26, 2005 (JP) .............................. 2005-127844

(51) Int. Cl.
H04N 1/034 (2006.01)
H04N 1/52 (2006.01)
H04N 1/60 (2006.01)

(52) U.S. Cl. .................. 358/1.8; 358/1.9; 358/1.13; 358/502; 358/523; 358/534; 347/12; 347/14

(58) Field of Classification Search .................. 358/1.9, 358/2.1, 3.06, 3.24, 1.13, 502, 518, 523, 358/534, 1.8; 347/3, 5, 9, 12, 14, 15, 40, 347/43
See application file for complete search history.

(56) References Cited

U.S. PATENT DOCUMENTS 5,600,353 A * 2/1997 Hickman et al. .............. 347/43
7,401,877 B2 * 7/2008 Campbell et al. ............. 347/15

FOREIGN PATENT DOCUMENTS

| JP | 6-255098 A | 9/1994 |
|---|---|---|
| JP | 10-278246 A | 10/1998 |
| JP | 11-196285 A | 7/1999 |
| JP | 2002-331693 A | 11/2002 |
| JP | 2002-337323 A | 11/2002 |
| JP | 2004-142423 A | 5/2004 |

* cited by examiner

Primary Examiner—Scott A Rogers
(74) Attorney, Agent, or Firm—Sughrue Mion, PLLC (57) ABSTRACT

An inkjet printer performs printing by scanning a printing head having a plurality of ink nozzles, and has a monotone printing mode and a color printing mode. Under the condition of using the same print medium and the same printing resolution, the average pass count for the monotone printing mode is set to a larger value than the average pass count for the color printing mode.

7 Claims, 12 Drawing Sheets

3D-LUT 411 for Color Image Printing

Fig.3B

1D-LUT 413 for Monotone Image Printing

Fig.4

Fig.5
Scanning Method for Color Printing (First Embodiment)

Fig.6

Scanning Method for Color Printing (First Embodiment)

Scanning Method for Monotone Printing (First Embodiment)

Printing resolution = 720 dpi
In-use nozzle count = 20
Average pass count = 4

Fig.9
Scanning Method for Color Printing (Second Embodiment)

Fig.10

Scanning Method for Color Printing (Second Embodiment)

| Pass | 1 | 2 | 3 | 4 | 5 | 6 | 7 | 8 | 9 |
|---|---|---|---|---|---|---|---|---|---|
| Feed Amount | 9 | 9 | 9 | 9 | 9 | 9 | 9 | 9 | 9 |

Printing resolution = 720 dpi
In-use nozzle count = 20
Average pass count = 2.2

| Line No. | P1 | P2 | P3 | P4 | P5 | P6 | P7 | P8 | Pass Count |
|---|---|---|---|---|---|---|---|---|---|
| L21 | #19 | #10 | #1 | #10 | #19 | #10 | #1 | #10 | 3 |
| L22 | #8 | #17 | #8 | #17 | #8 | #17 | #8 | #17 | 2 |
| L23 | #15 | #6 | #15 | #6 | #15 | #6 | #15 | #6 | 2 |
| L24 | #4 | #13 | #4 | #13 | #4 | #13 | #4 | #13 | 2 |
| L25 | #20 | #11 | #2 | #11 | #20 | #11 | #2 | #11 | 3 |
| L26 | #9 | #18 | #9 | #18 | #9 | #18 | #9 | #18 | 2 |
| L27 | #16 | #7 | #16 | #7 | #16 | #7 | #16 | #7 | 2 |
| L28 | #5 | #14 | #5 | #14 | #5 | #14 | #5 | #14 | 2 |
| L29 | #3 | #12 | #3 | #12 | #3 | #12 | #3 | #12 | 2 |

Recording pixel position

Fig.11
Scanning Method for Monotone Printing (Second Embodiment)

Fig.12

Scanning Method for Monotone Printing (Second Embodiment)

| Pass | 1 | 2 | 3 | 4 | 5 | 6 | 7 | 8 | 9 | 10 | 11 |
|---|---|---|---|---|---|---|---|---|---|---|---|
| Feed Amount | 7 | 7 | 7 | 7 | 7 | 7 | 7 | 7 | 7 | 7 | 7 |

Printing resolution = 720 dpi
In-use nozzle count = 18
Average pass count = 2.6

| Line No. | P1 | P2 | P3 | P4 | P5 | P6 | P7 | P8 | Pass Count |
|---|---|---|---|---|---|---|---|---|---|
| L31 | #19 | #12 | #5 | #12 | #19 | #12 | #5 | #12 | 3 |
| L32 | #7 | #14 | #7 | #14 | #7 | #14 | #7 | #14 | 2 |
| L33 | #16 | #9 | #2 | #9 | #16 | #9 | #2 | #9 | 3 |
| L34 | #11 | #18 | #11 | #4 | #11 | #18 | #11 | #4 | 3 |
| L35 | #6 | #13 | #6 | #13 | #6 | #13 | #6 | #13 | 2 |
| L36 | #8 | #15 | #8 | #15 | #8 | #15 | #8 | #15 | 2 |
| L37 | #17 | #10 | #3 | #10 | #17 | #10 | #3 | #10 | 3 |
| L38 | #12 | #19 | #12 | #5 | #12 | #19 | #12 | #5 | 3 |
| L39 | #7 | #14 | #7 | #14 | #7 | #14 | #7 | #14 | 2 |

SETTINGS FOR MONOTONE PRINTING AND COLOR PRINTING

CROSS REFERENCE TO RELATED APPLICATIONS

The present application claims the priority based on Japanese Patent Application No. 2005-127844 filed on Apr. 26, 2005, the disclosure of which is hereby incorporated by reference in its entirety.

BACKGROUND OF THE INVENTION

1. Field of the Invention

This invention relates to a printer that can execute monotone printing and color printing.

2. Description of the Related Art

Inkjet printers can execute various types of printing such as color printing and monotone printing. As monotone printing, there is achromatic image printing (by narrow definition, "monochromatic printing") and printing that reproduces images to which a slight color tone is added to an achromatic color (by narrow definition, "monotone printing"). As color tones of a monotone image, there are many types that can be used including neutral tones, warm tones, cool tones, and sepia tones. Note that with this specification, unless otherwise stated, "monotone printing" is used in the broad meaning that also includes the narrow definition of monochromatic printing. Monotone printing technique is described in several prior art references such as JPH11-196285A, JP2002-331693A, JP2002-337323A, and JP2004-142423A.

However, in the past, the actual circumstances were that there were few contrivances for how to set the respective scanning methods for performing monotone printing and color printing on the same printer.

SUMMARY OF THE INVENTION

An object of the present invention is to provide technology for setting the respective suitable scanning methods for monotone printing and color printing.

According to an aspect of the present invention, there is provided an inkjet printer that performs printing by scanning a printing head having a plurality of ink nozzles. The inkjet printer has a monotone printing mode and a color printing mode. An average pass count that is an average value of scan pass counts of the ink nozzles on each scan line are respectively set to 1 or greater for the monotone printing mode and the color printing mode. The average pass count for the monotone printing mode is set to be a larger value than the average pass count for the color printing mode under printing conditions which use an identical print medium and an identical printing resolution for the monotone printing mode and the color printing mode.

There is a general tendency for the "banding" to be more visible with the monotone printing mode than with the color printing mode. In light of this, by setting a larger value for the average pass count of the monotone printing mode than for the average pass count of the color printing mode, it is possible to reduce the banding for the monotone printing mode.

Note that with this invention, various aspects can be realized, and for example, it is possible to realize aspects such as a printing method and a printing device, a printing control method and a printing control device, a computer program for realizing the functions of those methods or devices, a recording medium on which is recorded that computer program and the like.

These and other objects, features, aspects, and advantages of the present invention will become more apparent from the following detailed description of the preferred embodiments with the accompanying drawings.

DESCRIPTION OF THE PREFERRED EMBODIMENT

A. First Embodiment

Figure 1:
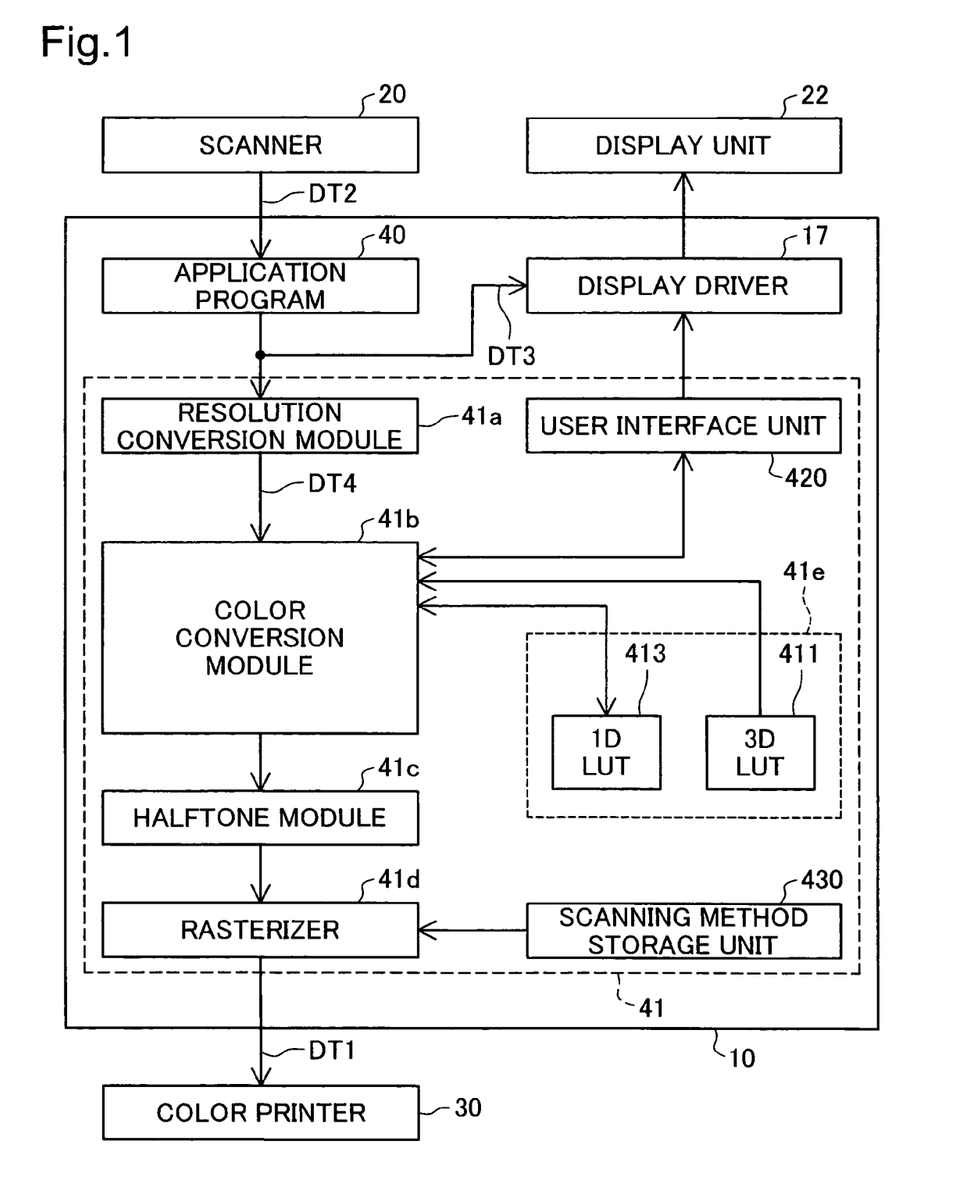
FIG. 1 is a block diagram showing an image processing system as an embodiment of the invention.

FIG. 1 is a block diagram showing an image processing system as an embodiment of the invention. This image processing system has a computer 10, a scanner 20, and a color printer 30.

The scanner 20 reads image data DT2 from the source image and outputs it to the computer 10. The computer 10 displays an image on the display unit 22 based on this image data DT2, and has the image printed on the color printer 30. When it is desired to print the read image using color, normally RGB signals are used as the image data DT2.

With the computer 10, an application program 40 operates under a specified operating system. A display driver 17 and a printer driver 41 are incorporated in this operating system. The printer driver 41 outputs print data DT1 to the color printer 30.

The application program 40 can be photo retouching software, for example, and performs processing such as retouching of images for the image data DT2. The image data DT3 obtained and processed by the application program 40 is given to the display driver 17 or the printer driver 41.

When the application program 30 issues a printing command, the printer driver 41 of the computer 10 converts the processed image data DT3 to the printing signals DT1 and sends them to the color printer 30. The printing signals DT1 include data indicating the dot formation status of a plurality of types of ink (also referred to as "dot data") and the sub scan feed amounts.

The printer driver 41 includes a resolution conversion module 41*a*, a color conversion module 41*b*, a color conversion table 41*e*, a halftone module 41*c*, a rasterizer 41*d*, lookup tables 41*e*, a user interface unit 420, and a scanning method storage unit 430.

The user interface unit 420 displays a printing condition setting screen (described later) on the display unit 22, and also fetches the printing conditions set by the user and supplies them to each of the processing modules 41*a* to 41*d*. The scanning method storage unit 430 stores in advance the scanning method used for each printing condition. A specific example of a scanning method is described later.

The resolution conversion module 41*a* converts the resolution of the image data DT3 obtained from the application program 40 to the printing resolution to thereby produce converted image data DT4. The color conversion module 41*b* decides an ink amount of each ink used by the color printer 30 for each pixel based on the image data DT4 after resolution conversion using the color conversion table 41*e*. The halftone module 41*c* generates dot data representing the dot formation status of each pixel by executing so-called halftone processing. The rasterizer 41*d* realigns the dot data in the data sequence for transferring to the color printer 30, and outputs printing signals DT1 as the final printing data to the color printer 30. This data realignment is a process that selectively aligns only dot data related to dots formed by the printing head during one main scan. Note that the rasterizer 41*d* correlates to the data alignment unit, and the color printer 30 correlates to the printing mechanism.

The color conversion module 41*b* references the color conversion table 41*e* when converting the image data DT4 to ink amount data. A three dimensional lookup table (LUT) 411 is used for color printing, and a one dimensional lookup table 413 is used for monotone printing.

As the monotone image that is the subject of monotone printing, when the image read by the scanner 20 is a monochromatic (black and white) image, it is possible to use that monochromatic image as is. Alternatively, even when the image read by the scanner 20 is a color image, it is possible to convert this to a monotone image with color correction by the application program 40. When the source image is a color image, it is possible to change the color image to a monotone image. Note that by giving a color tone such as a warm tone, cool tone, sepia tone, or the like to a black and white image, it is possible to generate a monotone image with a desired color tone. In this case, it is preferable that the color tone setting screen for setting the color tone of the monotone image be displayed on the display unit 22 using the user interface unit 420. As this kind of color tone setting screen, it is possible to use a screen having a color circle for selecting the color tone, for example.

Figure 2:
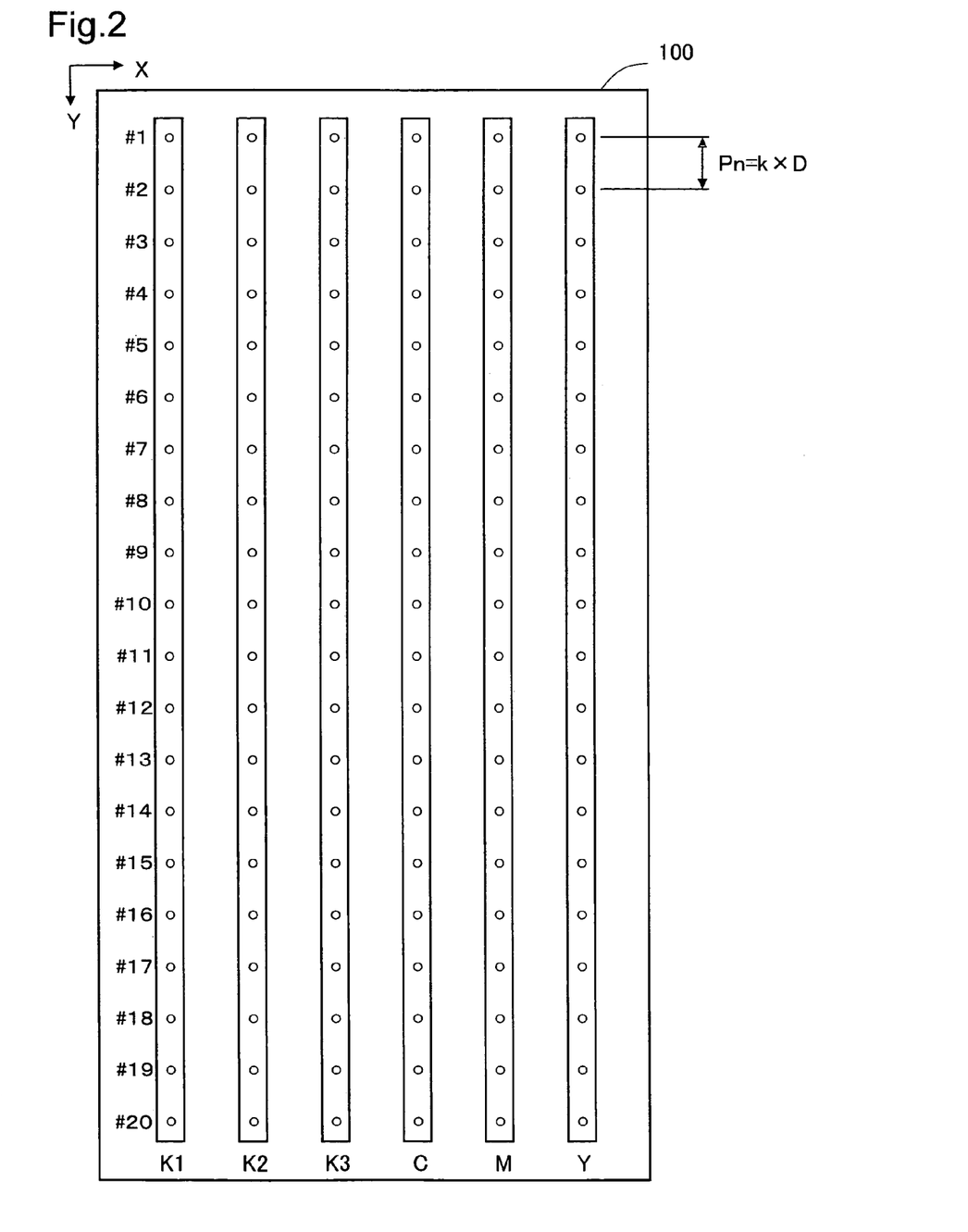
FIG. 2 is an explanatory drawing showing the nozzle alignment for the printing head.

FIG. 2 is an explanatory drawing showing the nozzle alignment for the printing head 100 of the printer 30. Provided on the printing head 100 are six nozzle arrays for jetting out six types of ink K1, K2, K3, C, M, and Y. This example uses three types of achromatic inks with different densities K1, K2, and K3, and three chromatic color inks cyan C, magenta M, and yellow Y. Among the three achromatic inks K1, K2, and K3, K1 has the highest density, K2 has the medium density, and K3 has the lowest density. Note that it is possible to use various inks other than these ink types.

Each ink nozzle array is respectively constituted with 20 nozzles aligned at a fixed nozzle pitch Pn along the sub scanning direction Y. Following, each nozzle is represented by nozzle number #1 to #20. These six sets of nozzle arrays are arranged in sequence along the main scanning direction X, and nozzles of the same original number for each nozzle array have the same position on the sub scanning direction Y. Note that with an actual printing head, it is preferable to have a higher number of nozzles. The nozzle pitch Pn is preferably set to a multiple k (k is an integer of 2 or greater) of the pixel pitch D in the sub scanning direction Y. Note that the pixel pitch D in the sub scanning direction is a value determined by the printing resolution of the sub scanning direction. For example, when the printing resolution of the sub scanning direction is 360 dpi, the pixel pitch D is approximately 70 μm, and when it is 720 dpi, the pixel pitch D is approximately 35 μm. When the printer 30 is able to use 360 dpi and 720 dpi printing resolution, the nozzle pitch Pn is set to a value correlating to 180 dpi, for example. In this case, when the printing resolution is 720 dpi, the value of the integer k is 4, and when it is 360 dpi, the value of the integer k is 2. With an embodiment of the scanning method described later, the integer k is set to 4. Note that following, the integer k may also be called "nozzle pitch k." Since k is an integer of 2 or greater, a so-called interlace scan is performed.

Figure 3A:
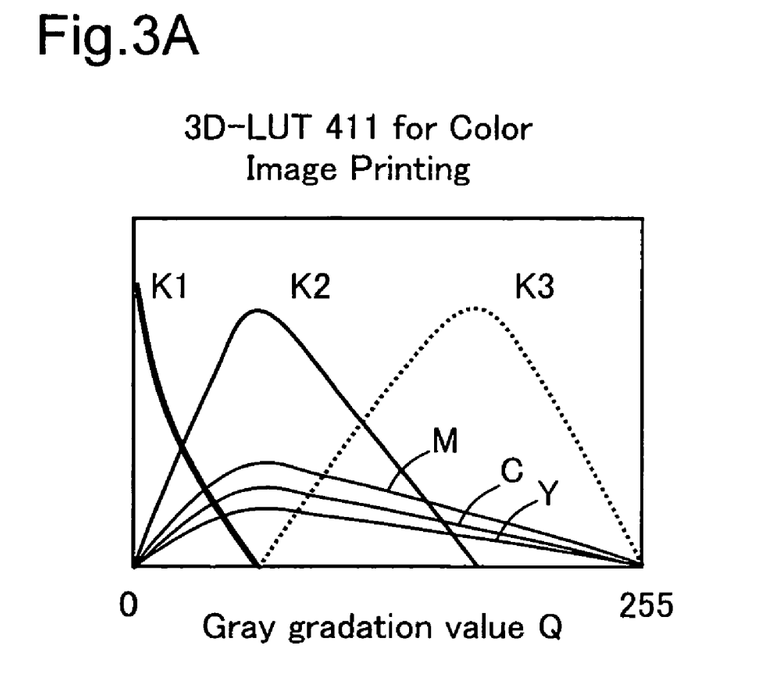
FIGS. 3A and 3B are explanatory drawings showing the contents of a three dimensional LUT for color printing and a one dimensional LUT for monotone printing.
Figure 3B:
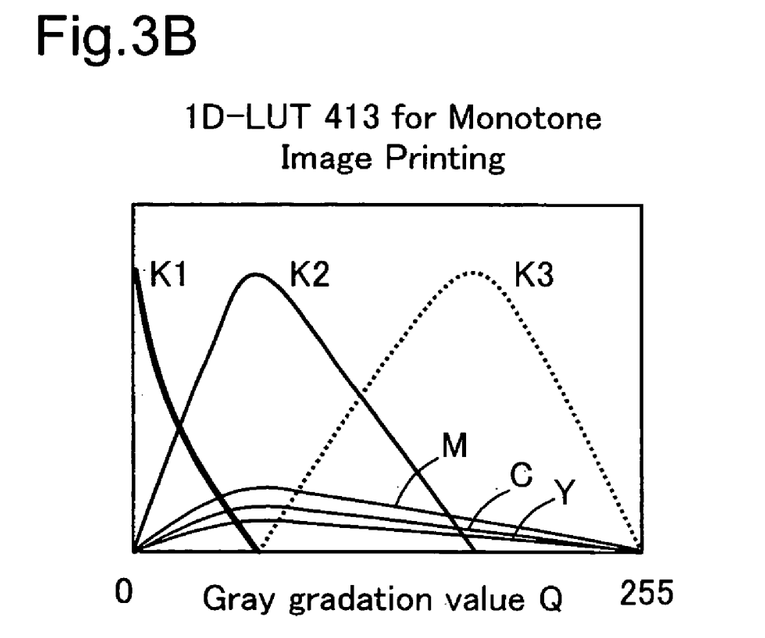

FIGS. 3A and 3B are explanatory drawings showing a comparison of the contents of the three dimensional LUT 411 for color image printing and the one dimensional LUT 413 for monotone image printing. Both of these show the ink amount of each ink for reproducing achromatic color gradations. The horizontal axis is the gray gradation value (hereafter called "gray gradation value" or "lightness gradation value") Q, and the vertical axis is the amount of each ink. Note that the larger the value of the gray gradation value Q, the higher the lightness.

In color printing, the gray gradation values Q are converted to six ink type ink amounts K1, K2, K3, C, M, and Y using the three dimensional LUT 411, and achromatic image portions are reproduced using these inks. In monotone printing, the gray gradation values Q are converted to six ink type ink amounts K1, K2, K3, C, M, and Y using the one dimensional LUT 413, and achromatic image portions are reproduced using these inks. Note that the name "one dimensional LUT" means that the input is one dimension (gray gradation values only). Output of the one dimensional LUT is constituted by a plurality of values representing use amounts of a plurality of types of ink used for monotone printing.

As shown in FIGS. 3A and 3B, when doing color printing as well as when doing monotone printing, it is preferable to use the three primary color inks of CMY (so called composite black) for reproduction of achromatic image portions. For monotone printing, the reason for using composite black is because it is possible to adjust the color tone of the monotone image using color inks, and there is also an effect of reducing so-called "banding", which is streak-like image degradation.

Also, as shown with the example in FIGS. 3A and 3B, it is preferable to decrease the composite black amount (CMY ink amount) in monotone printing than that in color printing. The reason for this is because there is a high possibility that with composite black, an unbalance will occur in the amounts of the color inks C, M, and Y, which will cause a skew from the achromatic color. With monotone printing, compared to with color printing, even a tiny amount of color tone skew is visible, and is easily recognized as image degradation. The reason for this is that with colors proximate to achromatic color, the sensitivity of the eye to color tone skew is high. Therefore, with monotone printing, it is preferable to reduce the amount of the composite black, and to reduce the possibility of the color tone being skewed. However, as described above, for monotone printing as well, it is preferable to use not only the achromatic inks K1 to K3 but also composite black using C, M, and Y inks.

Figure 4:
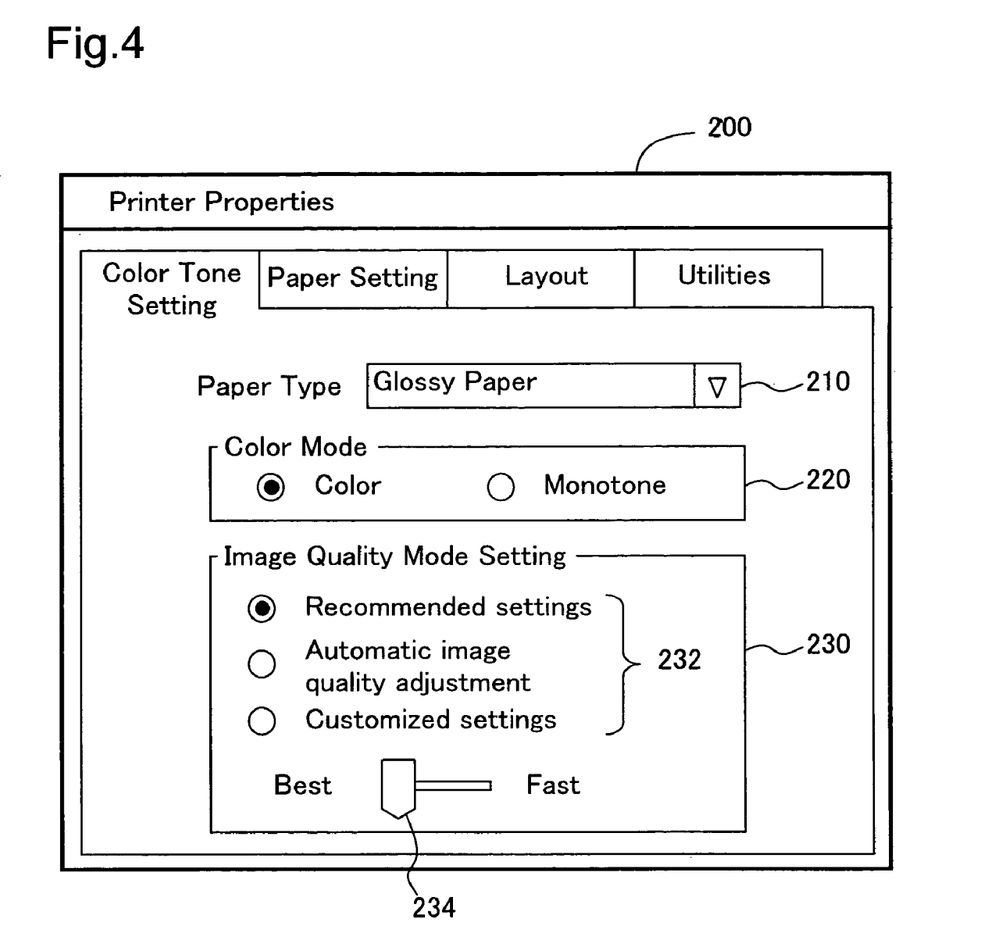
FIG. 4 is an explanatory drawing showing the printing condition setting screen.

FIG. 4 shows the printing condition setting screen 200 displayed on the display unit 22 (FIG. 1) when printing using the printer driver 41. This screen 200 is constituted so as to be able to switch using tabs between four screens including a color tone setting screen, a paper setting screen, a layout screen, and a utility screen. With the color tone setting screen shown in FIG. 4, there are a paper selection area 210, a color mode selection area 220, and an image quality mode setting area 230. The paper selection area 210 is for selecting a print medium to use for printing from among a plurality of types of printing media including glossy paper and plain paper. The color mode selection area 220 is for selecting one of either the color printing mode or the monotone printing mode. The image quality mode setting area 230 is for setting the various image processing conditions and printing conditions that affect the printing image quality. This image quality mode setting area 230 includes setting method selection buttons 232 for selecting one of three choices of "Recommended settings," "Automatic image quality adjustment," and "Customized settings," and a scanning mode selection switch 234 for selecting one of two image quality levels of "Best" and "Fast." The three choices of the setting method selection buttons 232 are not closely related to the embodiment, so a detailed explanation of these is omitted here.

The two image quality levels of "Best" and "Fast" are to achieve mutually different image qualities by a difference in the printing resolution. "Best" means relatively high printing resolution, while "Fast" means relatively low printing resolution. Note that it is also possible to use three or more image quality levels with different resolutions. With this embodiment, for the color printing mode and the monotone printing mode, both the "Best" and "Fast" image quality levels can be applied in common.

With this embodiment, when the printing conditions other than the color mode are the same, different scanning methods are used for the color printing mode and the monotone printing mode. Following, an example is described of the scanning methods when the same print medium (e.g. glossy paper) is selected and "Best" is selected using the image quality mode setting area 230.

Figure 5:
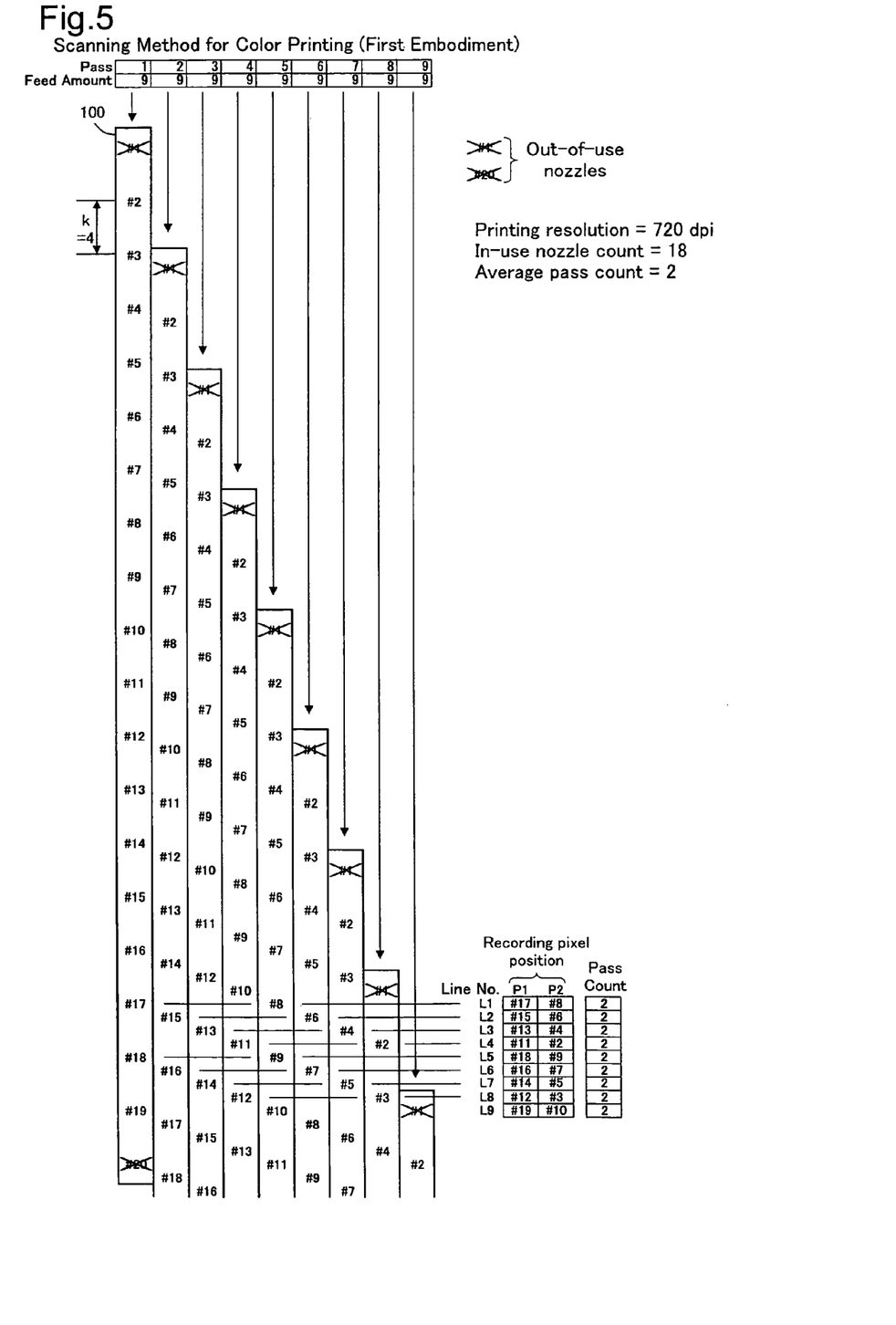
FIG. 5 is an explanatory drawing showing the scanning method for the color printing mode of the first embodiment.

FIG. 5 shows the scanning method for the color printing mode of the first embodiment. Here, the printing head 100 is represented by the twenty nozzles #1 to #20 of one type of ink, and shown is the position of the head 100 for the nine main scans from pass 1 to pass 9. In this specification, one main scan for forming ink dots is called a "pass." The twenty nozzles #1 to #20 are fed in the sub scanning direction each time one main scan ends. However, in actuality, the feeding in the sub scanning direction is realized by moving the printing paper by a sub scan drive mechanism (not illustrated). As shown in the upper part of FIG. 5, with this example, the sub scan feed amount is a fixed value of 9 dots. Therefore, each time a sub scan feed is performed, the position of the twenty nozzles is shifted 9 dots at a time in the sub scanning direction. This kind of scanning method using a fixed sub scan feed amount is called a "constant feed" or "regular feed." Instead of a constant feed, it is also possible to use a "variable feed" or "irregular feed" using in combination a plurality of different sub scan feed amounts.

With the example in FIG. 5, the top edge nozzle #1 and the bottom edge nozzle #20 are out-of-use nozzles, and the other nozzles #2 to #19 are in-use nozzles. "In-use nozzles" are nozzles to which are allocated pixel positions responsible for dot formation with the main scan for performing ink dot formation. Therefore, when dots are to be formed at those responsible pixel positions, ink is sprayed from the in-use nozzles. On the other hand, "out-of-use nozzles" are nozzles to which pixel positions responsible for dot formation are not allocated with the main scan for forming ink dots. Therefore, ink is not sprayed from the out-of-use nozzles. Normally, the number of in-use nozzles for each ink is the same. With this example, the in-use nozzle count for each ink is 18.

Figure 6:
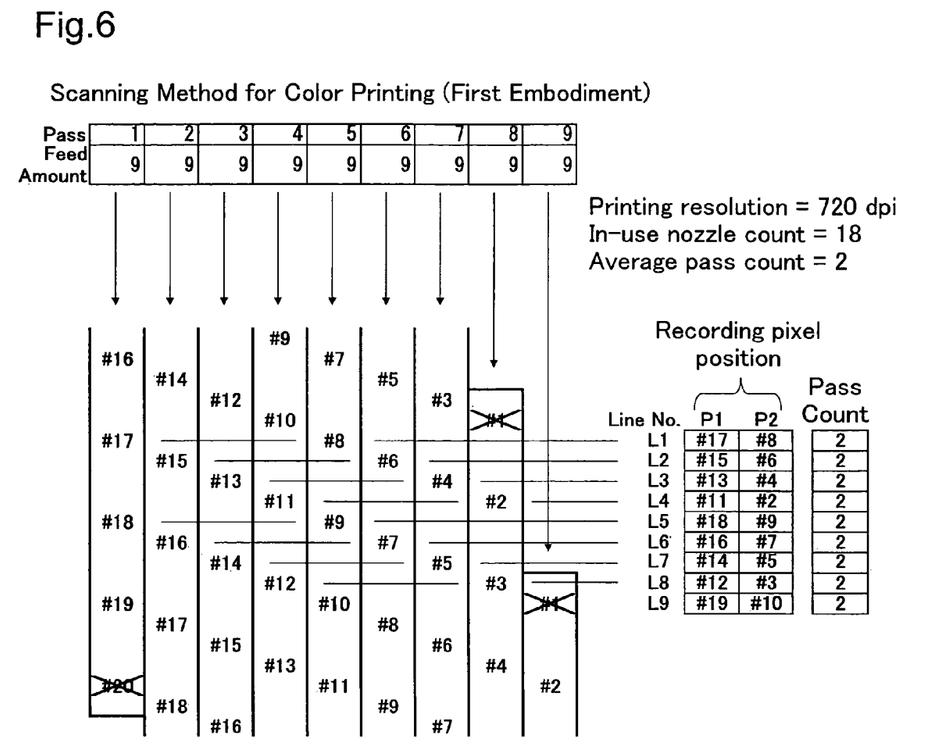
FIG. 6 is a drawing showing in enlarged form the scan lines L1 to L9 part of FIG. 5.

There are shown ordinal numbers of nozzle pairs that scan over the plurality of scan lines L1 to L9 at the lower right part of FIG. 5. FIG. 6 is a drawing showing in enlarged form the scan lines L1 to L9 of FIG. 5. For example, a dot at the first pixel P1 of the scan line L1 will be recorded by the nozzle #17, and a dot at the second pixel P2 will be recorded by the nozzle #8. For the third pixel and thereafter as well, this allocation of nozzles {#17, #8} for every two pixels is repeated. Specifically, dots at odd numbered pixels are recorded by the nozzle #17, and dots at even numbered pixels are recorded using the nozzle #8. In this way, the formation of dots on the scan line L1 is completed by two different nozzles, and thus the number of main scans required (in other words, the pass count) is 2. The other scan lines similarly are scanned using two different nozzles and the pass count for the scan line is also 2. Therefore, the average pass count per scan line is 2. Note that generally, the average pass count is set to a value of 1 or more.

Figure 7:
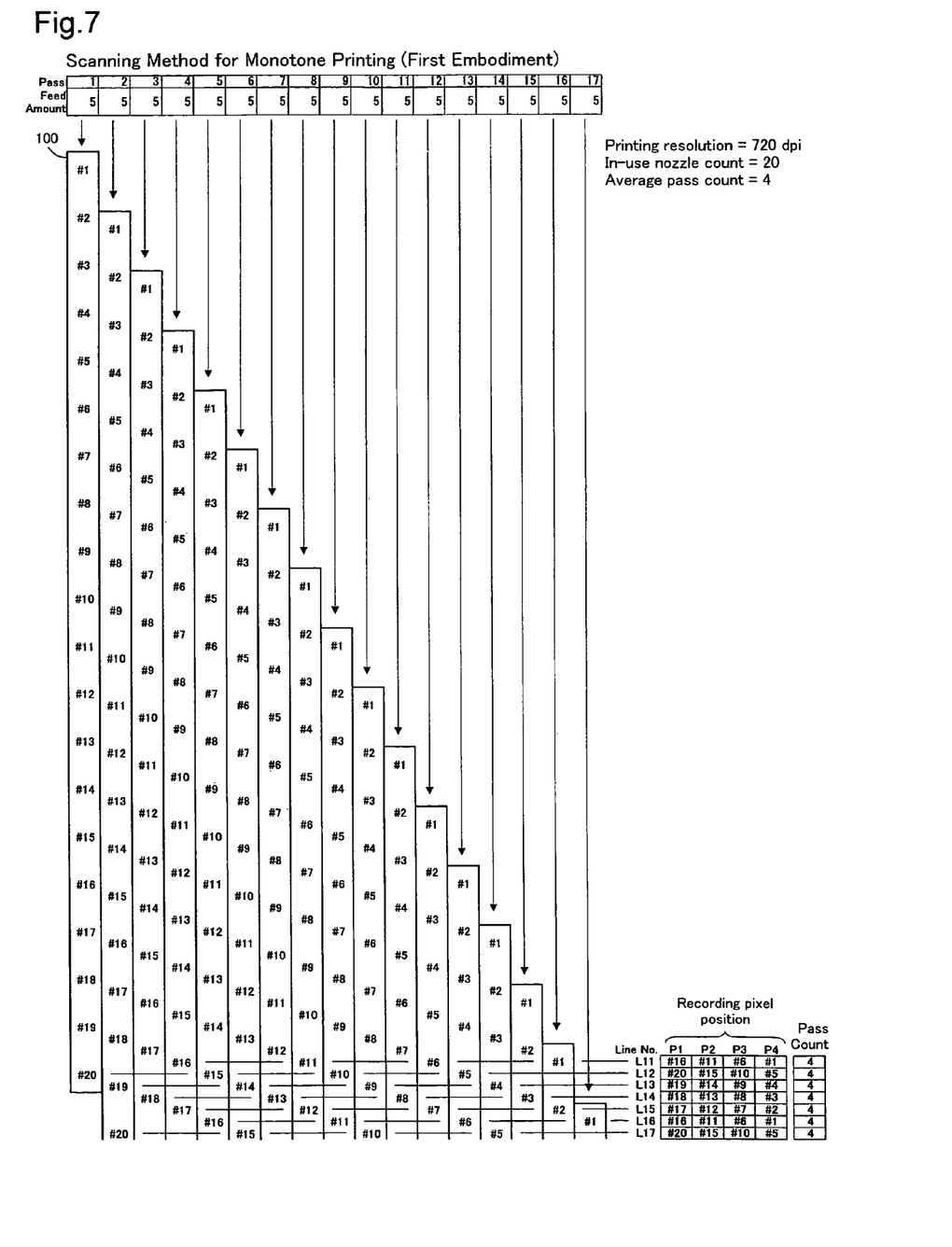
FIG. 7 is an explanatory drawing showing the scanning method for the monotone printing mode of the first embodiment.

FIG. 7 shows the scanning method for the monotone printing mode of the first embodiment. With this monotone printing, the sub scan feed amount is a fixed value of 5 dots, and all twenty nozzles #1 to #20 are in-use nozzles.

Figure 8:
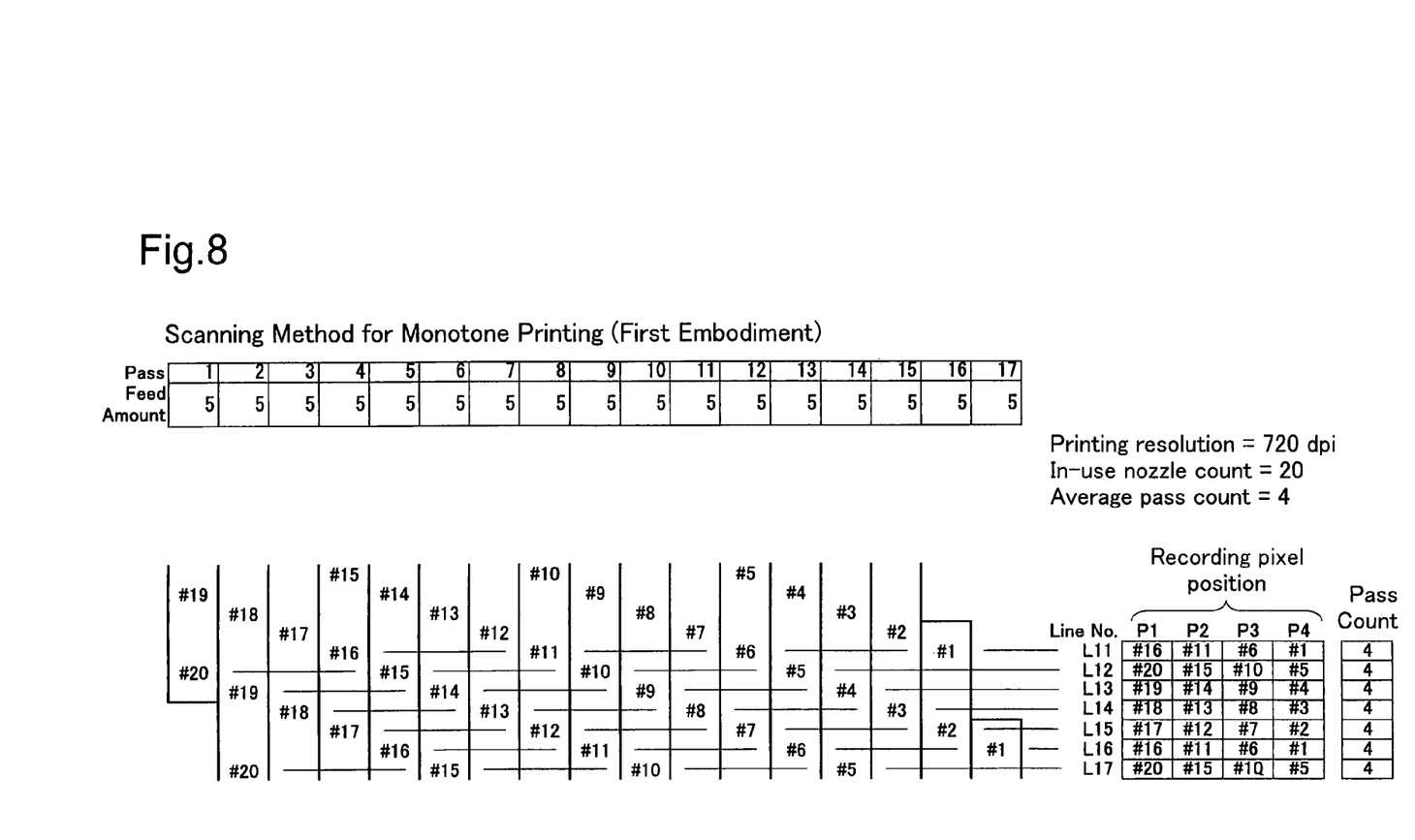
FIG. 8 is a drawing showing in enlarged form the scan lines L11 to L17 part of FIG. 7.

There are shown ordinal numbers of nozzle combinations that scan over the plurality of scan lines L11 to L17 at the lower right part of FIG. 7. FIG. 8 is a drawing showing in enlarged form the scan lines L11 to L17 of FIG. 7. For example, the allocation of the nozzles to each pixel on the scan line L11 is the sequence {#16, #11, #6, #1}, and this allocation of the nozzles {#16, #11, #6, #1} is repeated every four pixels. As can be understood from this, the pass count for the scan line L11 is 4. Similarly, the other scan lines also have a pass count of 4. Therefore, the average pass count per scan line is 4 in this example.

As can be understood by comparing FIG. 6 and FIG. 8, with the first embodiment, under the conditions of the print medium and the printing resolution being the same, the average pass count for the monotone printing mode is 4, which is set to be a larger value than the average pass count (=2) for the color printing mode. These arrangements will attain the following effects. There is a general tendency that a number of dots recorded per unit area in the monotone printing mode is smaller than that in the color printing mode. The reason for this is that a large number of ink dots of different colors is necessary to reproduce a large number of colors in color printing, while that kind of necessity is lower in monotone printing. When the dot count per unit area is low, banding is more visible. Here, "banding" means the streak-like image quality degradation that typically extends in the scanning direction. For example, when the dot position is displayed in the sub scanning direction, there are cases when there is an excessive broadening of the gap between two adjacent scan lines, and the dots on the two scan lines become separated. Conversely, there are also cases when there is an excessive narrowing of the gap between two adjacent scan lines, and there can be significant overlapping of dots on two scan lines. This kind of gap or overlapping between two adjacent scan lines are observed as "banding." This kind of banding can be decreased by increasing the pass count. Specifically, actual ink drop positions have a tendency to slightly skew from the nozzle positions in the sub scanning direction. Therefore, if dot formation on each scan line is executed with a large number of nozzles, it is possible to disperse the dot position variations in the sub scanning direction on that scan line. Even in a case if gaps or overlap occur between adjacent scan lines when dots on each scan line are formed by a single nozzle, if dots on that scan line are formed using a plurality of nozzles, it is possible to reduce the gaps or overlap. In this way, generally, banding can be reduced by increasing the pass count for each scan line. However, as described above, there is a tendency for banding to be more visible with monotone printing because there is a lower dot count per unit area than with color printing. In light of this, by setting the average pass count for each scan line in the monotone printing mode to a higher value than that in the color printing mode, it is possible to prevent excessive visibility of banding with the monotone printing mode.

Note that under the condition of the printing resolution being the same, the printing speed is almost proportional to the average value of the sub scan feed amounts. Therefore, in terms of the printing speed, it is preferable to have a higher sub scan feed amount. The color printing mode scanning method is constituted as a scanning method that achieves sufficient printing speed while also suppressing banding to within an acceptable range.

Also, as described with FIGS. 3A and 3B, with this embodiment, the use amount of composite black for reproducing achromatic color in the color printing mode is set to be higher than that in the monotone printing mode. When the amount of composite black is low, the dot count per unit area is also low, so there is a tendency for banding to be more visible. In this way, when the amount of composite black for reproducing achromatic color in the color printing mode is greater than that in the monotone printing mode, a marked effect will be expected by setting the average pass count for the monotone printing mode to be higher than that for the color printing mode.

The scanning method shown in FIG. 5 to FIG. 8 is stored in advance in the scanning method recording unit 430 which is non-volatile memory. The rasterizer 41*d* realigns the dot data in the data sequence in which to be transferred to the printer 30 according to this scanning method and generates the final printing data DT1.

As described above, with the first embodiment, under the condition of having the same print medium and printing resolution, the average pass count for the monotone printing mode is set to be a larger value than that for the color printing mode, so it is possible to keep the banding from being inconspicuous for the monotone printing, and it is possible to obtain sufficient printing speed while maintaining high image quality for the color printing mode.

Note that the relationship of the average pass counts for the monotone and color printings is not necessary to be established with respect to every printing resolution, but rather, it may be established at least for one printing resolution. In this case, of the plurality of printing resolutions that can be used for that print medium, it is preferable that the relationship of the average pass counts described above be established for the highest resolution.

B. Second Embodiment

Figure 9:
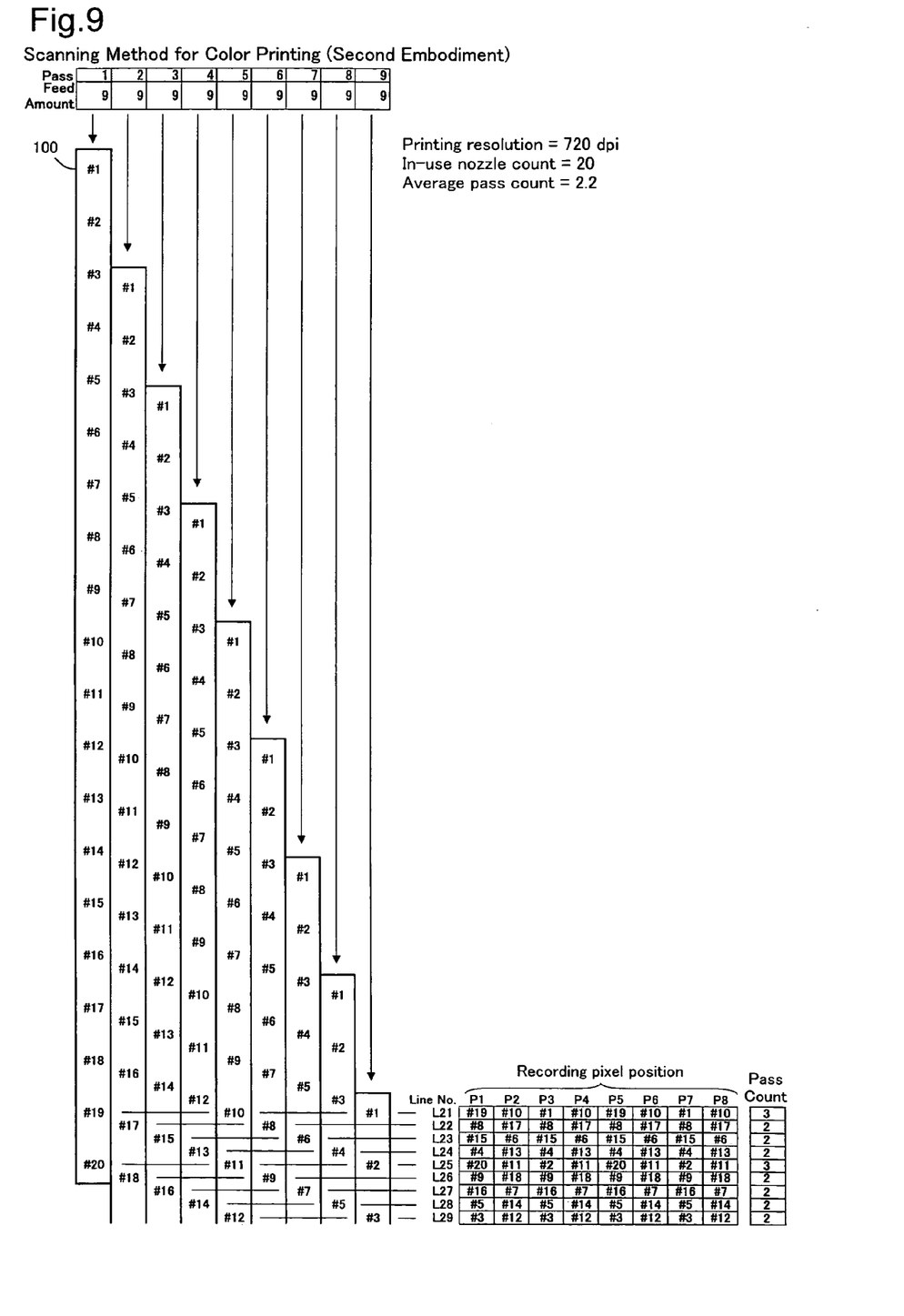
FIG. 9 is an explanatory drawing showing the scanning method for the color printing mode of the second embodiment.

FIG. 9 shows the scanning method for the color printing mode of a second embodiment. With this color printing, the sub scan feed amount is a fixed value of 9 dots, and all twenty nozzles #1 to #20 are in-use nozzles. Note that the second embodiment device constitution is the same as that of the first embodiment, and only the scanning method is different from the first embodiment.

Figure 10:
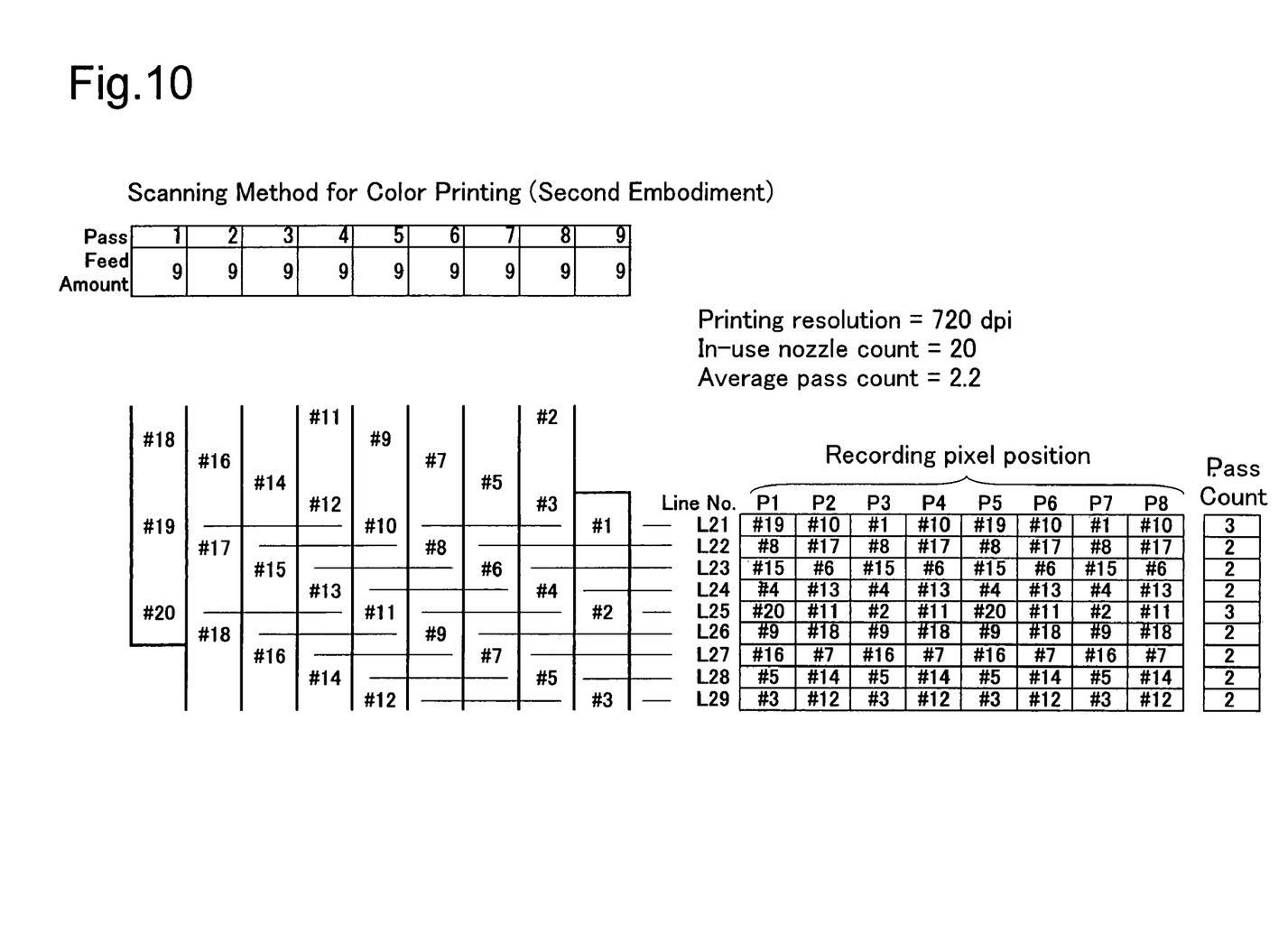
FIG. 10 is a drawing showing in enlarged form the scan lines L21 to L29 part of FIG. 9.

There are shown ordinal numbers of nozzle combinations that scan over the plurality of scan lines L21 to L29 at the lower right part of FIG. 9. FIG. 10 is a drawing showing in enlarged form the scan lines L21 to L29 of FIG. 9. For example, the nozzle allocation to each pixel on the scan line L21 is the sequence {#19, #10, #4, #10}, and this nozzle allocation {#19, #10, #1, #10} is repeated every four pixels. Here, it can be seen that the nozzle #10 is responsible for dot formation of the even numbered position pixels P2, P4, P6, and P8 . . . . Also, dot formation for the odd numbered position pixels P1, P3, P5, P7 . . . is done alternately by nozzle #19 and nozzle #1. In this way, the scan line L21 is scanned by three nozzles, so the pass count is 3. On the other hand, dot formation on the scan line L22 is performed by two nozzles #8 and #17, so that pass count is 2. As can be understood by looking at the right side of FIG. 10, after one scan line with a pass count of 3 appears in the sub scanning direction, four scan lines with a pass count of 2 appear, and this pattern is repeated. Therefore, the average pass count of this scanning method is 2.2. Note that generally, the average pass count is equal to the in-use nozzle count being divided by the average sub scan feed amount in unit of dot.

As shown in the example in FIG. 10, the scanning method for which the average pass count includes a fraction part is called "partial overlap printing." In comparison to this, the scanning method for which the average pass count is an integer is called "full overlap printing."

Figure 11:
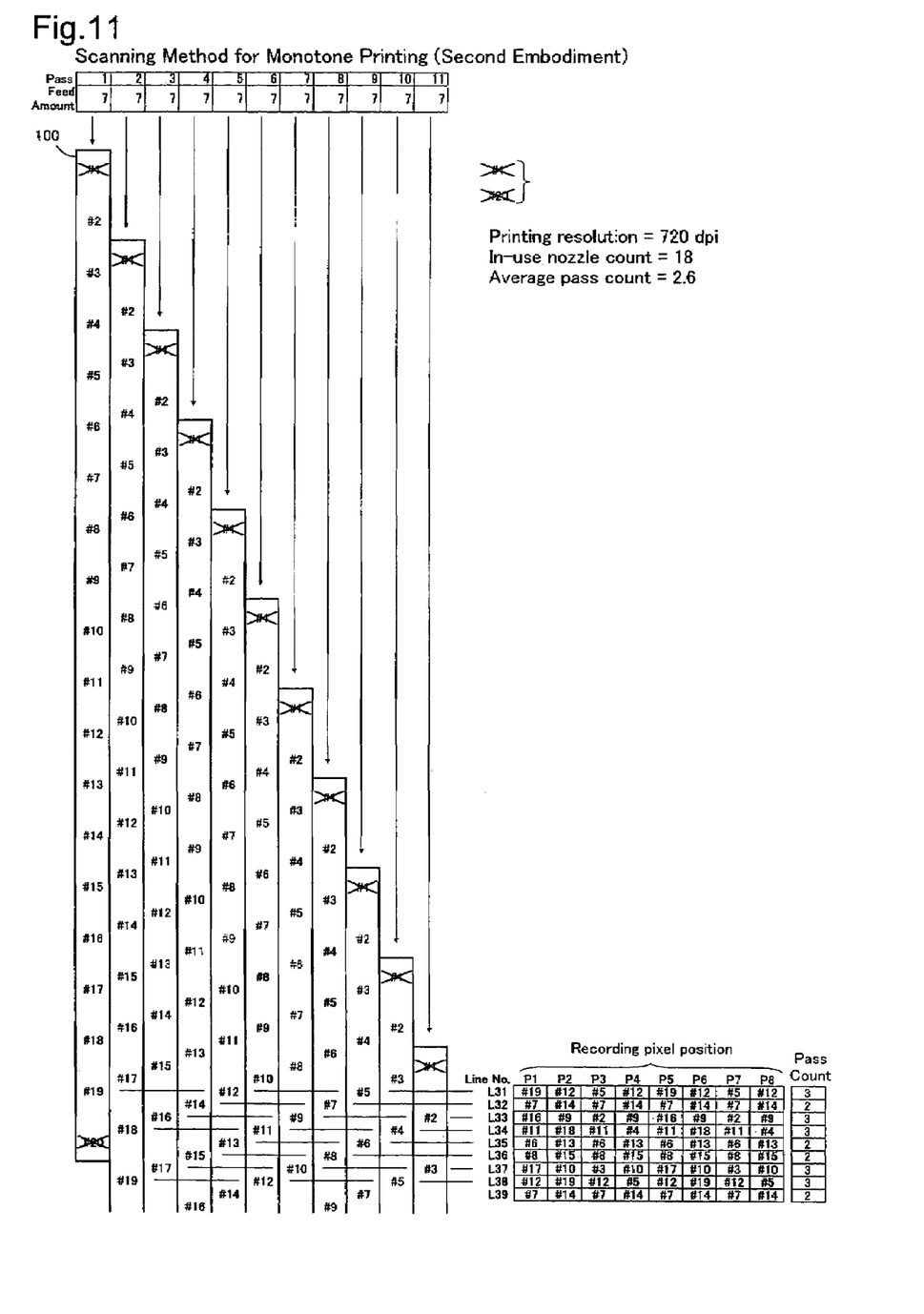
FIG. 11 is an explanatory drawing showing the scanning method for the monotone printing method of the second embodiment.

FIG. 11 shows a scanning method for the monotone printing mode of the second embodiment. With this monotone printing, the sub scan feed amount is a fixed value of 7 dots. Also, with this monotone printing, the nozzles #1 and #20 at both edges are out-of-use nozzles, and the other eighteen nozzles #2 to #19 are in-use nozzles.

Figure 12:
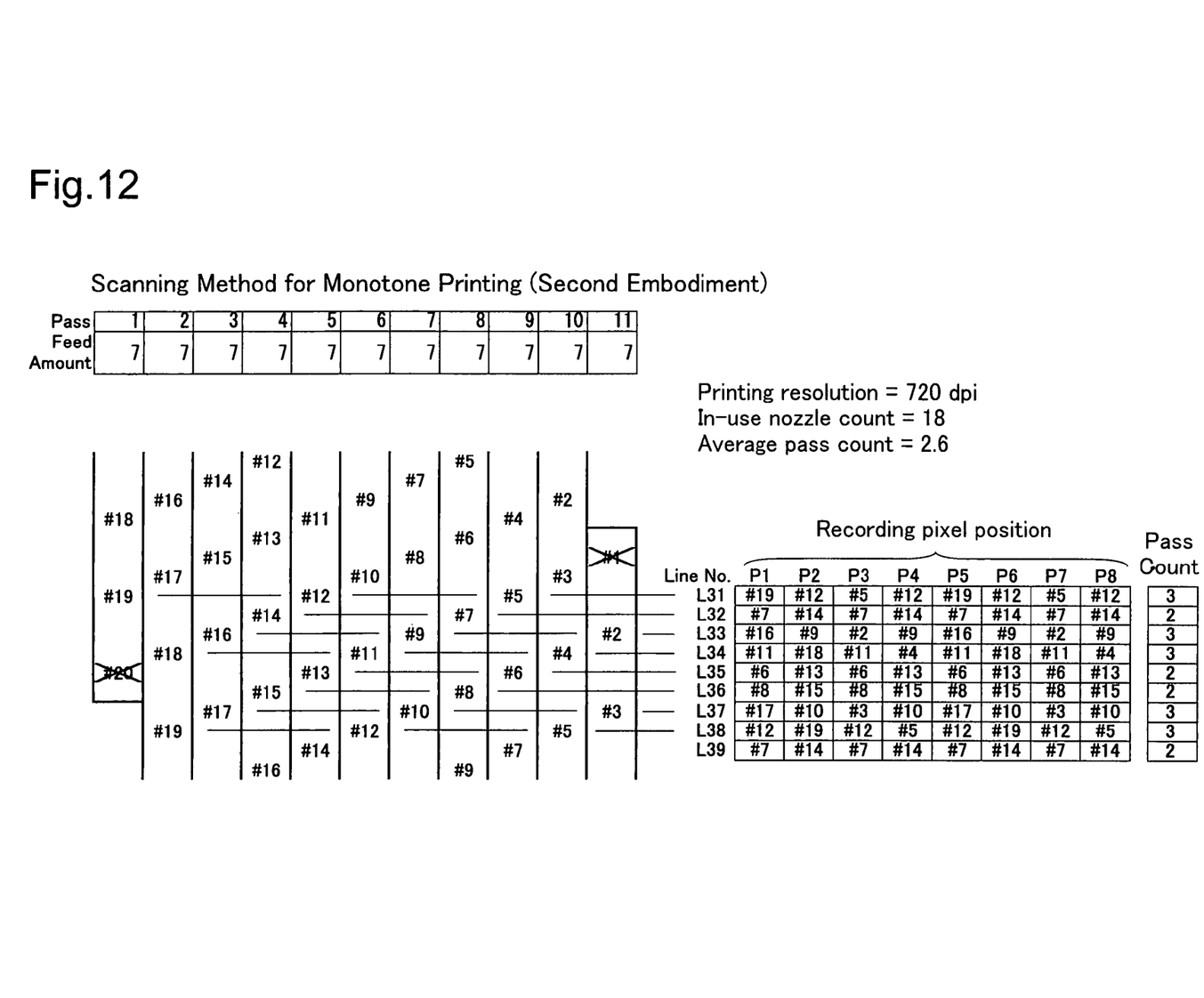
FIG. 12 is a drawing showing in enlarged form the scan lines L31 to L39 part of FIG. 11.

There are shown ordinal numbers of nozzle combinations that scan over the plurality of scan lines L31 to L39 at the bottom right of FIG. 11. FIG. 12 is a drawing showing in enlarged form the scan lines L31 to L39 of FIG. 11. For example, the allocation of nozzles to the pixels on the scan line L31 is the sequence {#19, #12, #5, #12}, and this nozzle allocation {#19, #12, #5, #12} is repeated every four pixels. Here, nozzle #12 is responsible for dot formation at the even numbered position pixels P2, P4, P6, P8 . . . . Also, nozzle #19 and nozzle #5 are alternately responsible for dot formation for odd numbered position pixels P1, P3, P5, and P7 . . . . In this way, the scan line L31 is scanned by three nozzles, so the pass count is 3. On the other hand, dot formation on the scan line L32 is performed by two nozzles #7 and #14, so the pass count for the scan line L32 is 2. As can be understood from looking at the right side of FIG. 12, the scan line with the pass count of 3 and the scan line with the pass count of 2 appear in a specified order in the sub scanning direction. As described previously, the average pass count is equal to the value for which the in-use nozzle count is divided by the average sub scan feed amount in unit of dot, so for the example in FIG. 12, the average pass count is 2.6.

As can be understood from comparing FIG. 10 and FIG. 12, for the second embodiment as well, under conditions with the print medium and the printing resolution the same, the average pass count (=2.6) for the monotone printing mode is set to a larger value than the average pass count (=2.2) for the color printing mode. Therefore, it is possible to keep the banding for the monotone printing from being inconspicuous.

Also, for the color printing mode, it is possible to obtain sufficient printing speed while maintaining high image quality.

Note that in the first embodiment both the monotone printing mode and the color printing mode are full overlap printing, while in the second embodiment both are partial overlap printing. However, it is also possible to have one of the monotone printing mode or the color printing mode be full overlap printing and the other be partial overlap printing.

C. Variation Examples

Note that this invention is not limited to the aforementioned embodiments and aspects, and it is possible to implement various aspects in a range that does not stray from the key points, with the following variation examples being possible, for example.

The embodiments are described using six types of ink, C, M, Y, K1, K2, and K3, but this invention can also be used in cases using any types of ink. For example, it can also be used in a case of performing printing using eight types of ink, C, M, Y, K1, K2, K3, Lc (light cyan ink), and Lm (light magenta ink).

The above embodiments utilize inkjet printers, but this invention can be applied to devices generally having a color printing function and a monotone printing function, and can also be applied to fax machines and copy machines.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An inkjet printer, comprising:
   print data generating means for generating printing data from image data; and
   a printing mechanism including:
      a printing head having a plurality of ink nozzles; and
      a scanning mechanism that moves the printing head to effect scanning of the printing head during printing,
      wherein the inkjet printer has a monotone printing mode and a color printing mode,
      an average pass count that is an average value of scan pass counts of the ink nozzles on each scan line are respectively set to 1 or greater for the monotone printing mode and the color printing mode,
      the average pass count for the monotone printing mode is set to be a larger value than the average pass count for the color printing mode under printing conditions which use an identical print medium and an identical printing resolution for the monotone printing mode and the color printing mode, and
      wherein the print data generating means includes:
         scanning method storage means for storing in advance a first scanning method for the monotone printing mode and a second scanning method for the color printing mode,
         color conversion means for converting the image data to ink amount data using a color conversion lookup table,
         halftone processing means for generating dot data representing dot formation status at each pixel by executing halftone processing on the ink amount data, and
         data alignment means for reading out the scanning method from the scanning method storage means according to the printing conditions and to adjust alignment of the dot data according to the read scanning method.

2. An inkjet printer in accordance with claim 1 wherein
   the color conversion lookup table includes a first color conversion lookup table for the monotone printing mode and a second color conversion lookup table for the color printing mode, and
   the first and second color conversion tables are constructed such that, responsive to achromatic input values, chromatic ink amounts output from the first color conversion lookup table are set lower than chromatic ink amounts output from the second color conversion lookup table.

3. A computer-readable medium storing a printer driver program executed on a computer, characterized in that:
   the printer driver program has a monotone printing mode and a color printing mode,
   an average pass count that is an average value of scan pass counts of ink nozzles on each scan line are respectively set to 1 or greater for the monotone printing mode and the color printing mode, and
   the average pass count for the monotone printing mode is set to be a larger value than the average pass count for the color printing mode under printing conditions which use an identical print medium and an identical printing resolution for the monotone printing mode and the color printing mode.

4. A computer-readable medium in accordance with claim 3, comprising:
   a print data generating module configured to generate printing data from image data according to the printing conditions, the print data generating module including
      a scanning method storage module configured to store in advance a first scanning method for the monotone printing mode and a second scanning method for the color printing mode,
      a color conversion module configured to convert the image data to ink amount data using a color conversion lookup table,
      a halftone processing module configured to generate dot data representing dot formation status at each pixel by executing halftone processing on the ink amount data, and
      a data alignment module configured to read out the scanning method from the scanning method storage module according to the printing conditions and to adjust alignment of the dot data according to the read scanning method.

5. A computer-readable medium in accordance with claim 4, wherein
   the color conversion lookup table includes a first color conversion lookup table for the monotone printing mode and a second color conversion lookup table for the color printing mode, and
   the first and second color conversion tables are constructed such that, responsive to achromatic input values, chromatic ink amounts output from the first color conversion lookup table are set lower than chromatic ink amounts output from the second color conversion lookup table.

6. A computer-readable medium storing a printer driver program executed on a computer, characterized in that:
   the printer driver program has a monotone printing mode and a color printing mode,
   an average pass count that is an average value of scan pass counts of ink nozzles on each scan line are respectively set to 1 or greater for the monotone printing mode and the color printing mode, and the average pass count for the monotone printing mode is set to be a larger value than the average pass count for the color printing mode under printing conditions which use an identical print medium and an identical printing resolution for the monotone printing mode and the color printing mode, the computer-readable medium further comprising:
- a print data generating module configured to generate printing data from image data according to the printing conditions, the print data generating module including
  - a scanning method storage module configured to store in advance a first scanning method for the monotone printing mode and a second scanning method for the color printing mode,
  - a color conversion module configured to convert the image data to ink amount data using a color conversion lookup table,
  - a halftone processing module configured to generate dot data representing dot formation status at each pixel by executing halftone processing on the ink amount data, and
  - a data alignment module configured to read out the scanning method from the scanning method storage module according to the printing conditions and to adjust alignment of the dot data according to the read scanning method.

7. A computer-readable medium in accordance with claim 6, wherein
- the color conversion lookup table includes a first color conversion lookup table for the monotone printing mode and a second color conversion lookup table for the color printing mode, and
- the first and second color conversion tables are constructed such that, responsive to achromatic input values, chromatic ink amounts output from the first color conversion lookup table are set lower than chromatic ink amounts output from the second color conversion lookup table.

* * * * *